US006618678B1

(12) United States Patent
Van Riel

(10) Patent No.: US 6,618,678 B1
(45) Date of Patent: Sep. 9, 2003

(54) METHOD OF JOINT ANALYSIS AND INTERPRETATION OF THE SUBSURFACE FROM MULTIPLE SEISMIC DERIVED LAYER PROPERTY DATA SETS

(75) Inventor: Paul Van Riel, Rotterdam (NL)

(73) Assignee: Jason Geosystems B.V., Rotterdam (NL)

( * ) Notice: Subject to any disclaimer, the term of this patent is extended or adjusted under 35 U.S.C. 154(b) by 0 days.

(21) Appl. No.: 09/579,695

(22) Filed: May 26, 2000

(51) Int. Cl.$^7$ ................................................ G01V 1/28
(52) U.S. Cl. .......................................... 702/14; 702/16
(58) Field of Search ............................. 702/5, 6, 7, 11, 702/12, 13, 14, 16, 17, 18, 2; 367/21, 25, 26, 38, 62, 63, 68, 69, 73

(56) References Cited

U.S. PATENT DOCUMENTS

| | | | |
|---|---|---|---|
| 5,838,634 A | | 11/1998 | Jones et al. ..................... 367/73 |
| 5,966,672 A | * | 10/1999 | Knupp .......................... 702/16 |
| 6,052,650 A | * | 4/2000 | Assa et al. ..................... 702/14 |
| 6,125,877 A | * | 10/2000 | Assa et al. ...................... 702/2 |

OTHER PUBLICATIONS

Connolly, Patrick; Elastic Impedance, the Leading Edge; Apr. 1999; 8 pgs.
Latimer et al.; "An Interpreter's Guide to Understanding and Working with Seismic–Derived Acoustic Impedance Data", The Leading Edge; Mar. 2000; 8 pgs.
Goodway et al.; "Improved AVO Fluid and Lithology Discrimination Using Lamé Petrophysical Parameters '$\lambda\rho$', '$\mu\rho$', & '$\lambda\mu$ Fluid Stack', from P and S Inversions"; Canadian Society of Exploration Geophysics ann. meeting; 4 pgs.

Anderson et al.; "Quantifying Fluid Prediction Using Angle–Dependent Inversion Measured Against Log Fluid Substitutions", Offshore Technology Conference; 2000; 6 pgs.
Pendrel et al.; "Estimation and Interpretation of P and S Impedance Volumes From Simultaneous Inversion of P–wave Offset Seismic Data"; 2000 Canadian Society of Exploration Geophysicists ann. meeting; 4 pgs.
Torres–Verdin et al.; Trace–based and Geostatiscal Inversion of 3–D Seismic Data for Thin–Sand Delineation: An application in San Jorge Basin, Argentina, The Leading Edge; Sep. 1999; 6 pgs.
John P. Castagna: Arco Oil and Gas Company.; Offset–Dependent Reflectivity–Theory And Practice of AVO Analysis; Investigations in Geophysics vol. 8 1993–1998; 35 pgs.

* cited by examiner

Primary Examiner—Edward Lefkowitz
Assistant Examiner—Anthony Gutierrez
(74) Attorney, Agent, or Firm—Webb Ziesenheim Logsdon Orkin & Hanson, P.C.

(57) ABSTRACT

A method for classification of a subsurface includes the steps of: inputting at least two seismic drive layer property data sets; inputting data defining one or more zones of interest in the classification input data sets; inputting analysis data sets with data types corresponding to that of the classification input data sets; inputting data defining a subset of interest in the analysis data sets; defining in the subset of interest within the data type space one or more data type subspaces that characterize subsurface features; selecting at least one data type subspace to be used for classification; determining which data points in the zone of interest fall within the selected data type subspaces; and typifying these data points to so classify these data points of the classification input data.

31 Claims, 12 Drawing Sheets

(8 of 12 Drawing Sheet(s) Filed in Color)

METHOD OF JOINT ANALYSIS AND INTERPRETATION OF THE SUBSURFACE FROM MULTIPLE SEISMIC DERIVED LAYER PROPERTY DATA SETS

FIELD OF THE INVENTION

This invention relates to the general subject of the analysis and interpretation of the subsurface from seismic and seismic derived layer property data sets.

BACKGROUND OF THE INVENTION

Seismic data is acquired to provide information about the subsurface structure, stratigraphy, lithology and fluids contained in the rocks. Acquired seismic data records are the response of a seismic energy source after passing through and being reflected by rocks in the subsurface. Seismic data can be acquired at or close to the earth's surface or can be acquired along boreholes. After acquisition, seismic data is typically processed to a set of seismic traces, where each trace represents the seismic response at a certain surface x,y location. The trace itself consists of a series of samples of the seismic response, usually ordered to correspond to increasing seismic travel time or, after depth conversion, increasing depth. Dependent on the acquisition geometry, the seismic traces are usually processed and organized to form lines with regularly spaced traces along the surface. The seismic data along such lines can be viewed as sections through the earth. Seismic data is referred to as 2-D seismic data when the lines are in different directions or are far apart relative to the spacing of the traces. Seismic data is referred to as 3-D seismic data when the acquisition is such that the processing results in a set of seismic lines that are organized sequentially and where the x,y trace locations form a regular grid and such that the spacing of the seismic lines generally is within the same order of magnitude as the spacing of the traces within the lines. In practice, the lines along which the data is acquired are called inlines and lines orthogonal to the inlines are referred to as crosslines. FIG. 1 shows a seismic section taken from a 3-D seismic data cube. 2-D and 3-D seismic data sets are subsequently analyzed and interpreted, generally on computer workstations with specialized software, to reveal the subsurface structure, stratigraphy, lithology and fluids, and to so predict the location, structure, stratigraphy, lithology and fluid distribution of hydrocarbon reservoirs, associated aquifers and other subsurface features of interest.

The amplitude of seismic data changes with changing angle of incidence of the seismic waves reflecting from a rock boundary. These changes of amplitude with angle can hold valuable information about the types of rocks in the subsurface and fluids they contain. For this reason in modern seismic processing multiple seismic data sets for analysis and interpretation are routinely generated from acquired seismic data. Examples are seismic data sets obtained by stacking seismic traces over different ranges of acquisition offsets or ranges of angles of incidence of the seismic waves. Such data sets typically concern pressure wave data. Connolly (1999) discusses methods for generating such seismic data sets. FIG. 1 shown above is actually a section from a partial stack over near angles. FIG. 2 shows the corresponding far angle partial stack. Comparison clearly shows differences in the seismic amplitude behavior caused by the change in incidence angles. Besides pressure wave data, other types of seismic data may also be available. In so called multi-component data acquisition the volumes of pressure wave seismic data are further augmented with one or more volumes of shear wave or converted pressure to shear wave seismic data. This provides further information about the subsurface.

The amplitudes of pressure, shear and converted wave seismic data are primarily determined by the strength of the reflection of seismic waves at layer boundaries. The reflection strength in turn is determined by changes in certain physical parameters of the rocks when going from one layer to the next and the angle of incidence of the seismic waves at the layer boundaries. The physical rock parameters are determined by the physical properties of the rock matrix, i.e. the rock with empty rock pores, and fluids contained in the pores, jointly referred to as 'rock property data'. Changes in the rock matrix can be caused by changes in the lithology (rock mineral composition, porosity and build-up). Changes in fluids can arise from changes in the relative fractions of the fluid types: water, oil and gas and changes in the properties of the fluid types. Using modern computer algorithms, rock property data that is directly related to the amplitudes of the seismic data can be estimated from the seismic data. Such rock property data which is directly related to seismic data includes acoustic impedance, shear wave impedance, density, pressure wave and converted wave elastic impedance and functionally directly related parameters such as pressure and shear wave velocity or slowness, the Lame parameters and the Lame parameters multiplied by density. For the relationship of such parameters to seismic data see e.g. Castagna and Backus (1993). For the estimation of such rock properties from seismic data see e.g. Goodway et al. (1998), Connolly et al. (1999), Anderson and Bogaards (2000) and Pendrel et al. (2000). FIG. 3 shows an acoustic impedance section and FIG. 4 a shear impedance section which are derived from the seismic data shown in FIG. 1 and FIG. 2. The acoustic and shear impedance have been estimated using a seismic inversion method as described by Pendrel et al. (2000). Further rock property data can also be derived directly or indirectly using functional, statistical or other relationships between the different rock properties. For example geostatistics provides a powerful approach to derive further rock property parameters, see e.g. Torres-Verdin et al. (1999). Seismic derived rock property data can be directly used to analyze changes in lithology and fluids in layers. Also, information about structure and stratigraphy is maintained and often even enhanced relative to seismic data. Use of seismic derived rock property data in subsurface analysis and interpretation is therefore often preferred over the use of seismic reflection data. For the same reason the subject method is preferably applied to seismic derived rock property data.

Importantly, seismic derived rock property data directly characterize the properties of the earth's layers, in contrast to seismic data that directly characterizes the reflection properties of layer interfaces. The fact that seismic derived rock properties characterize the properties of rock layers has as key advantage that they can be directly related to other measurements of the earth's layer properties, such as obtained from well logs. For a further discussion of the benefits of carrying out subsurface analysis and interpretation in the layer domain, see e.g. Latimer et al. (2000).

Besides different seismic derived rock property data sets, further data sets, referred to as layer attribute data sets, may be also be available for analysis and interpretation. An example are the data sets derived from seismic derived rock property data sets where the amplitudes are a measure of the continuity (or discontinuity) of the layers. For example U.S. Pat. No. 5,838,634 describes a method that can also be applied to seismic derived rock property data. Yet further information may be available in the form of estimation uncertainties and other statistical measures about the various rock properties.

In summary, a wide range of seismic derived rock property, layer attribute and layer statistical data can be produced with methods among others from seismic data processing, estimation, inversion and (geo)statistics. As most of these data sets refer to the properties of layers, they are further referred to as 'seismic derived layer properties' to contrast them to seismic data and most common attributes directly derived from seismic data which characterize seismic reflections at layer interfaces.

Seismic derived layer properties can be interpreted with the same methods as available for seismic data. However, the seismic derived layer properties measure properties of a layer. This means that information about the layers and their properties is directly available and not indirectly through measurements of interface properties which are impacted by the properties of the layers above and below the interface. Further, seismic derived layer properties, as opposed to seismic reflection data, can be directly related to other measurements of those layer properties, for example as provided by well logs. These favorable features form the basis for a novel method for the analysis and highly automated interpretation of the subsurface from seismic derived layer property data.

SUMMARY OF THE INVENTION

The present invention provides a new and improved method for the joint analysis and interpretation of two or more seismic derived layer property data sets. The main steps in the method comprise respectively data input, data analysis, classification, spatial connectivity analysis and output of the results.

The input data for the process consists of seismic derived layer property data sets and data to define zones of interest within these data sets to which the classification and spatial connectivity analysis is applied. Further input is data that is used in an analysis step to define a layer parameter subspace or subspaces that are used to drive the classification process. This analysis data may consist of well log data, attribute horizons, the same data which is input for classification, other layer property data sets, statistical distribution functions or other any other data. The analysis input data must at least contain the same type of data as the classification input data.

After data input the next step is data analysis and subspace definition. In this step the analysis input data is analyzed, for example using crossplots, and one or more layer property parameter subspaces are defined, where the layer property parameters correspond to the parameters in the layer property data sets input to the classification.

The next step in the procedure is to classify the classification input data sets by scanning all points in these data sets falling within the zone of interest for points where the parameter values are such that they fall inside a selected subspace or subspaces.

The classification step is followed by a spatial connectivity analysis step. In this step points are selected based on their classification, and these points are analyzed to determine geobodies consisting of sets of spatially connected points.

After any of the above steps, results may be visually inspected. Based on these results input data and/or the parameters steering any of the above steps may be revised.

The main outputs of the process are data sets with the classification results and the geobodies. Further output may also be generated, for example in the form of maps capturing the geobodies.

The method is not limited to application in hydrocarbon exploration, development and production. The method may be applied to seismic data acquired for other subsurface analysis applications, for example for shallow gas detection, subsurface stability analysis, basin analysis, coal and other mineral resource exploration and mining, and water resource development. The method is equally suited for the analysis of echo-acoustic data acquired for medical and material investigations. dr

BRIEF DESCRIPTION OF THE DRAWINGS

The file of this patent contains at least one drawing executed in color.

As illustrated in FIG. 11, the classification and subsequent connectivity analysis show that two of the geobodies shown in FIG. 9 are each broken up into two separate geobodies.

DETAILED DESCRIPTION OF THE PREFERRED EMBODIMENTS

Figure 1:
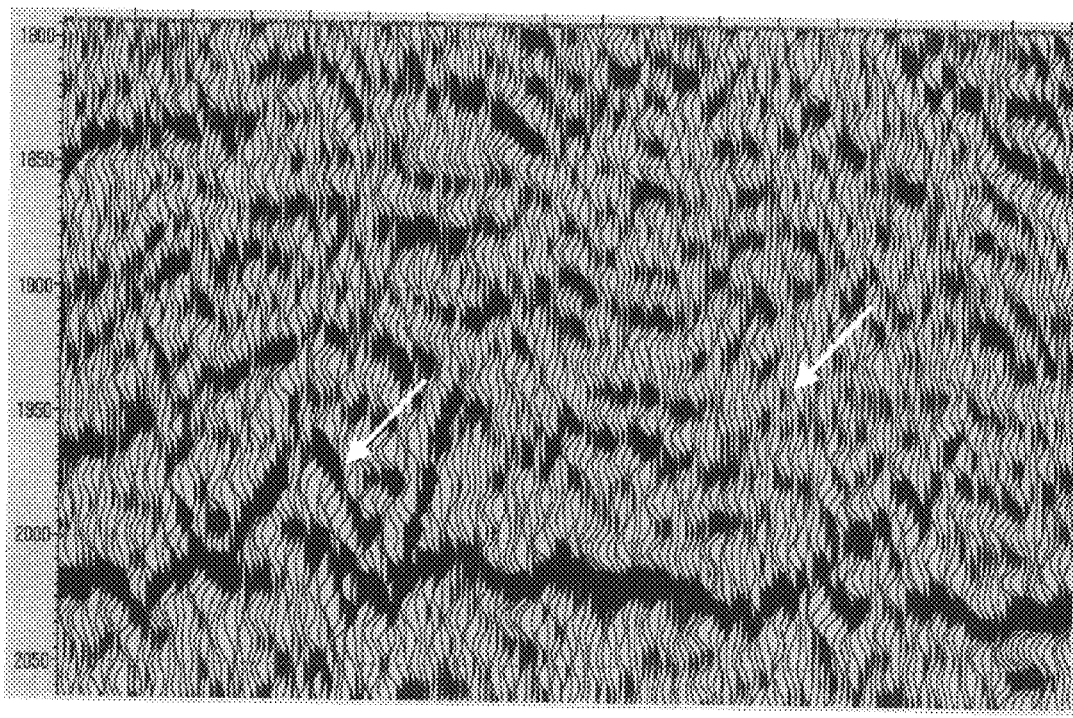
FIG. 1 is an example of a seismic reflection amplitude section from a 3-D seismic cube obtained from a partial stack over near angles of incidence. The seismic response is over a time gate encompassing a hydrocarbon reservoir sand. The display is in so called wiggle mode, where the black filled wiggles correspond to positive values in the traces of seismic data. Stronger reflections are indicated by larger excursions of the wiggles.
Figure 2:
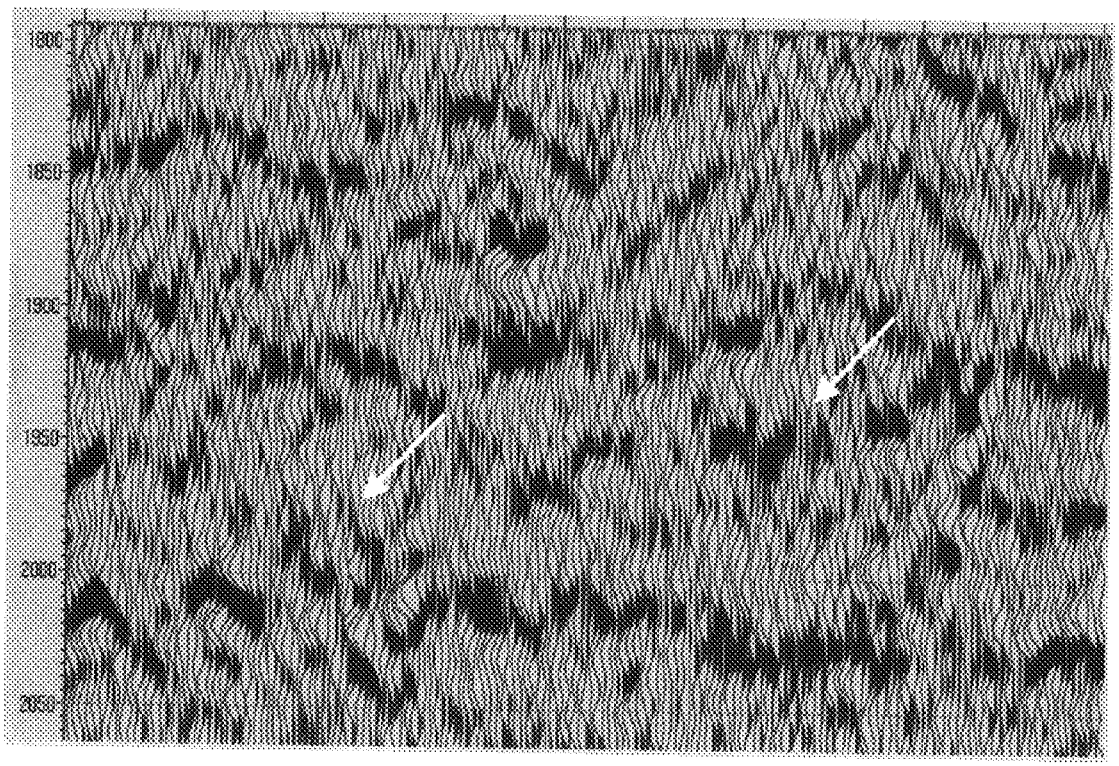
FIG. 2 shows the same section as in FIG. 1, but now from a partial stack over far angles of incidence. The arrows in FIG. 1 and FIG. 2 indicate areas with strong relative changes of seismic reflection amplitude with changing angle of incidence.

This invention can be embodied in many different forms. The disclosure and description of the invention in the drawings and in this description are illustrative and explanatory thereof, and various changes in the sequence of processing steps, of the parameters in the processing and of the process details may be made without departing from the scope of the invention.

Figure 5:
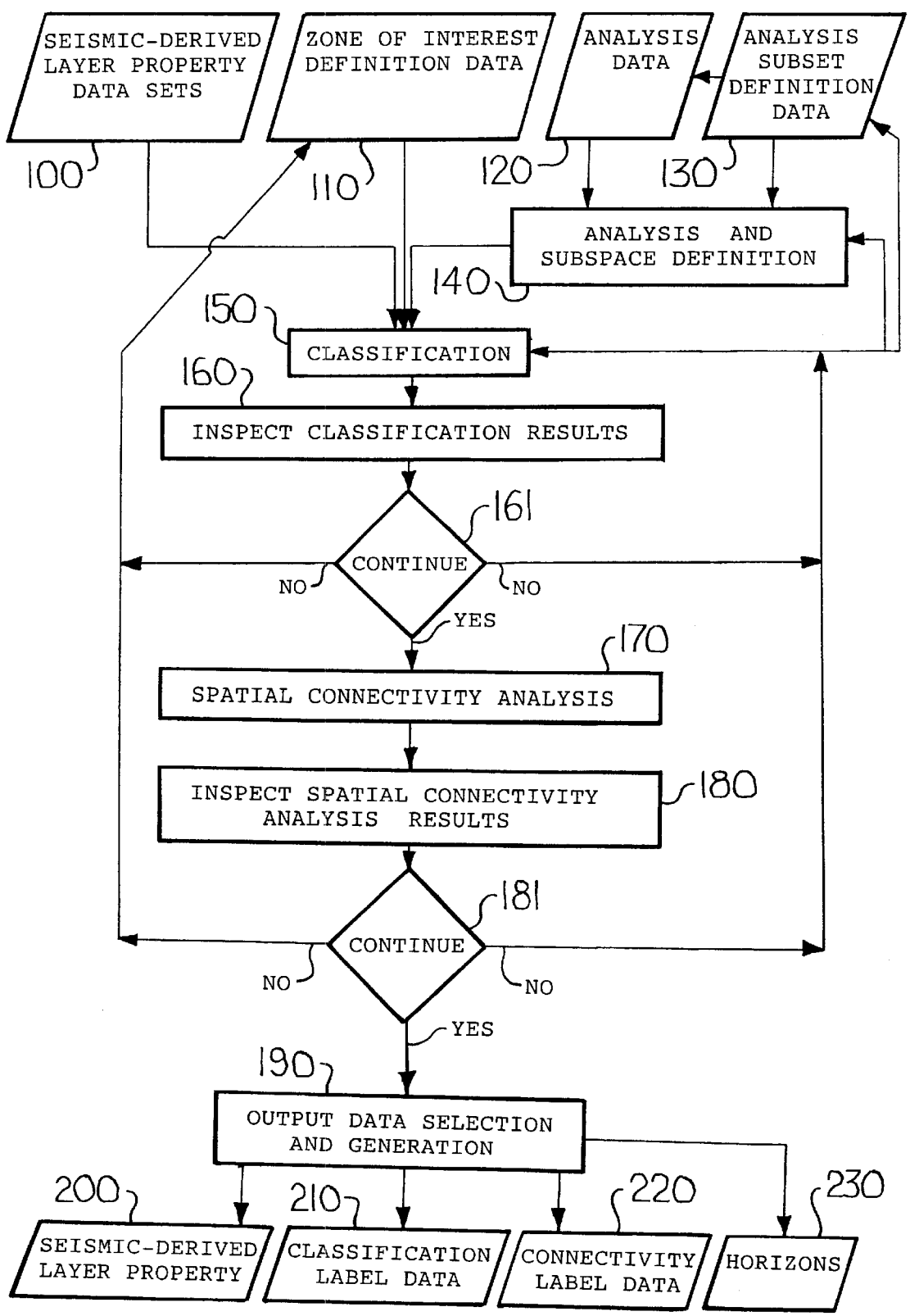
FIG. 5 is a flowchart showing the process steps in one embodiment of the new method.

FIG. 5 illustrates the steps in the new process in the form of a flowchart.

Step 100 shows the input of two or more 2-D, 3-D or mixed 2-D/3-D seismic derived layer property data sets for the classification process in step 150. All these data are assumed to have their data points on the same x,y,t grid in case of data sets in time or x,y,z grid in case of data sets in depth. These grids will in practice mostly be regular, but this is not a requirement. Because these grids are defined in 3-D space, any data defined on such grids is referred to as volume data. The data input in step 100 is further referred to as classification input data or data for classification.

Step 110 shows the input of data that may be used to define one or more zones of interest in the classification input data. One simple way to define a zone of interest is to define spatial limitations by specifying a set of traces to be used for areal delineation and two time horizons in case of time data and two depth horizons in case of depth data for vertical delineation. Another way is to use the results of discrete classification, which may have come from prior application of the subject process, where the zone of interest is defined to consist of selected classes. Such methods may of course also be combined, for example where an initial zone of interest defined using discrete classification results is further limited by applying spatial limitations. The data used to define a zone of interest is referred to as zone of interest definition data.

Step 120 shows the input of the data for the analysis in step 150. The results of this analysis step are used to drive the classification process. There are many alternative sources of input data for the analysis step. For example, the data may consist of the same data sets used for the classification step or selected parts thereof, may consist of attribute horizons extracted from seismic derived layer property cubes, may consist of well logs, may consist of various forms of user defined data, for example in the form of thresholds or the parameters of a statistical distribution function, or may consist of combinations of these data. The data input in step 120 is further referred to as analysis input data or data for analysis.

One condition on the analysis input data is that for each data type in the classification input data input in step 100 there must at least be data of the same type available to drive the analysis. Input of other types of data is allowed and is generally very useful. For example, assume the classification input data consists of two types of seismic derived layer property data: pressure wave impedance and shear wave impedance. Then the data to be used in the analysis must minimally contain these two data types. An example is to use suites of well logs where the well logs contain pressure wave impedance and shear wave impedance logs. In well log suites additional information is generally available, such as on water saturation, porosity and certain mineral fractions. This additional information can be related to the impedance well logs to determine how the impedances discriminate for certain lithologies and fluids.

A further condition for the success of the method is that the classification input data sets and the corresponding analysis input data sets are properly calibrated to each other. For each classification input data set the corresponding analysis input data must correspond in amplitude.

Step 130 shows the input of data that may be used to define a subset of interest in the analysis input data. The way information is provided to define a subset depends on the data used for the analysis. For volume data, these are the same as under step 110. For horizons a subset may be defined, for example, by areal limitation as defined by one or more polygons. For wells, a well log subset may be defined using well tops or a time or depth gate. The data used to define a subset of interest in the analysis data is referred to as analysis subset definition data.

Step 140 shows the analysis and subspace definition step. The analysis and subspace definition step operates on the space defined by the layer property parameters of the classification input data. The dimensionality of this space is equal to the number of different seismic derived layer properties in the classification input data. The objective of the analysis step is to define in this layer property parameter space a subspace, that may be of any shape, which characterizes certain subsurface features of interest, for example hydrocarbon bearing sands.

Figure 3:
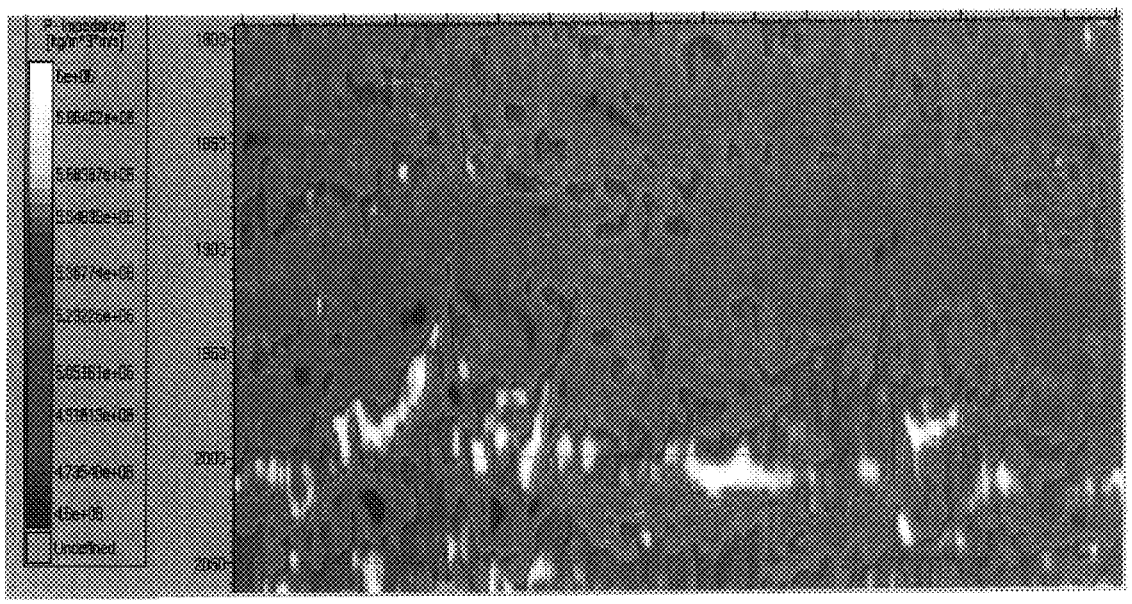
FIG. 3 shows a section of seismic derived rock property data, in this case acoustic impedance. The section is the same as in FIG. 1 and FIG. 2. Lighter colors correspond to higher impedance values.
Figure 4:
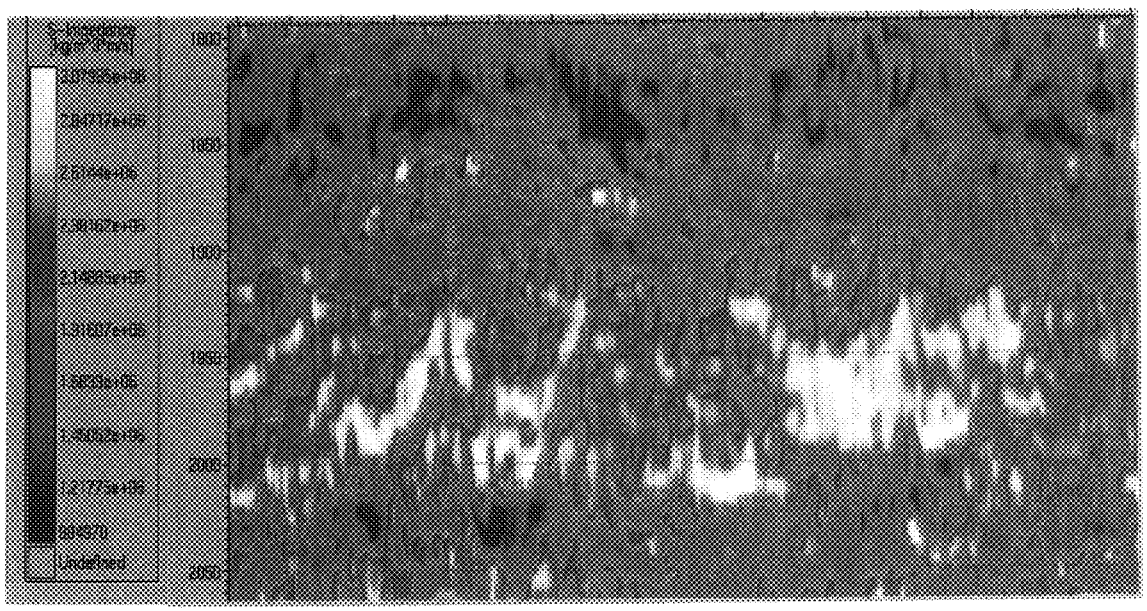
FIG. 4 shows a second section of seismic derived rock property data, in this case shear impedance. The section is the same as in the previous figures. Lighter colors correspond to higher impedance values.
Figure 6:
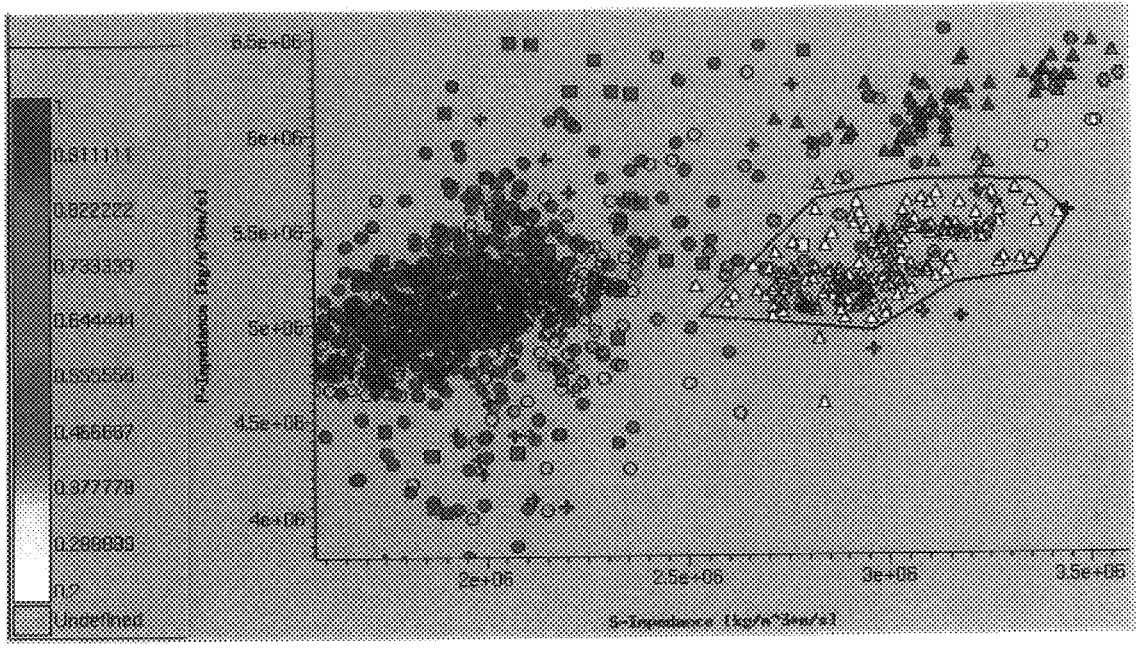
FIG. 6 shows how a crossplot is used to define a subspace. A crossplot is shown of acoustic and shear impedance logs from a well close to the section shown in FIGS. 1–4. The crossplot points are classified into different lithologies using differently shapes symbols, where sands are coded as triangles. The crossplot points are further color coded with water saturation, such that light colors correspond to low water saturation (i.e. high hydrocarbon saturation). The polygon thus captures the subspace in the crossplot corresponding to hydrocarbon bearing sandstone.

Many methods are available to define parameter subspaces. A simple way is with thresholds. However, thresholds support only a coarse definition of subspaces. A preferred, much more general way to define a parameter subspace is through polygons defined with the help of crossplots, possibly in combination with thresholds. An example is shown in FIG. 6, where pressure wave impedance and shear wave impedance 3D volumes derived from seismic are the input for the classification process. Sections through this data are shown in FIG. 3 and FIG. 4. In this example the analysis input data of step 120 are in the form of well log data from a well in the same area as the classification input data and the analysis subset definition data of step 130 is in the form of well tops. FIG. 6 shows a crossplot of pressure wave impedance versus shear wave impedance derived from the well log data within the zone delimited by the well tops. It is noted that similar crossplots could have been obtained from other analysis input data sources such as the seismic derived pressure wave impedance and shear wave impedance data sets, horizons extracted from these data sets, statistical distribution functions or any combination. In the crossplot of FIG. 6 the crossplot points have been coded with symbols to differentiate different lithologies and are further color coded with water saturation. These are examples of the use of additional data to enhance the analysis and to help determine the shape of subspaces that capture certain subsurface characteristics of interest. The crossplot further shows how a polygon has been defined to capture a certain 2-dimensional subspace, in this case corresponding to hydrocarbon bearing sands.

Figure 10:
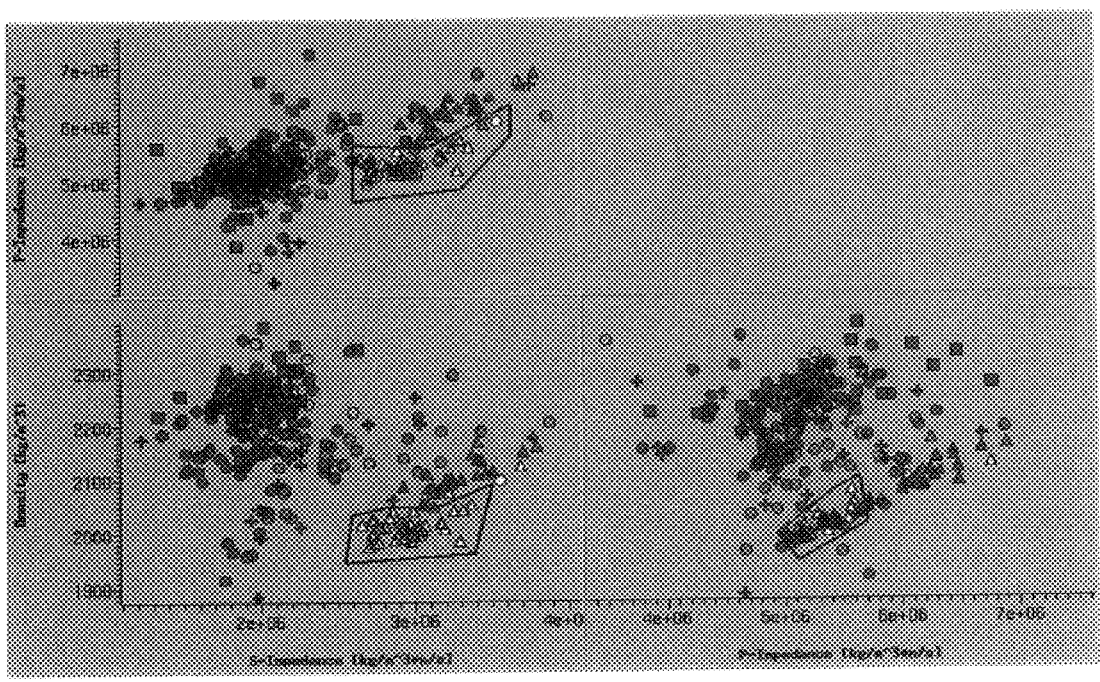
FIG. 10 shows how a three-dimensional subspace is defined using multiple two-dimensional crossplots. In this case the three parameters are acoustic impedance, shear impedance and density. To define the three-dimensional subspace three two-dimensional crossplots are used, respectively for acoustic impedance and shear impedance, acoustic impedance and density, and shear impedance and density. As illustrated, a different polygon can be defined in each of the crossplots. The three two-dimensional polygons jointly define a three-dimensional subspace.

The polygon in the crossplot example captures a 2-dimensional subspace that can easily be graphically defined. It can also easily be extended to 3 and more dimensions. One simple way is where the definition of subspaces for dimension 3 and up is done through simple thresholds using distribution functions for these parameters. An alternative is to use multiple lower dimensional crossplots. An example of this is shown in FIG. 10, where three 2-dimensional crossplots are used to define a 3-D subspace using a set of 2-D crossplots. Alternatively, the graphical methodology to capture a subspace is easily extended to 3 dimensions using modem 3-D graphics tools. Higher dimensions can then be captured using a series of crossplots analogous to the procedure illustrated in FIG. 10 and/or using thresholds.

Useful non-graphical methods also exist to capture multi-dimensional subspaces, for example with cluster analysis. These can be combined with the cross plot based analysis.

Many ways are available to describe the geometry of subspaces. For example, a 2-D polygon can be defined by a series of coordinate pairs connected by straight 1-D lines. In 3-D a subspace may be defined by a series of 2-D plane surface segments to form a polyhedron, and so on for higher dimensions. It also feasible instead of straight lines to use smooth curves defined through a set of coordinate definition points in case of 2-D and e.g. spline surface in case of 3-D etc. All this information which specifies subspaces is readily stored in a computer.

In most cases the points inside a subspace are assumed to characterize the points of interest. However, the converse may be true, and the space outside the subspace may characterize the points of interest. This meaning is easily attached to any subspace stored in a computer, for example by use of a simple flag. In the following, when a subspace is referred to for use in classification, this can both refer to points inside or outside the subspace, dependent on the meaning attached to the subspace by the user.

With the analysis step multiple subspaces may be defined, which individually or in some combination characterize certain subsurface features of interest. To distinguish subspaces in this regard, they may be individually named and/or labels may be attached to identify their meaning, for example labels to characterize certain lithology and fluid combinations or other reservoir characteristics.

To summarize, any appropriate method to define a meaningful layer rock property parameter subspace or subspaces may be applied. The key is that the analysis step produces one or more multi-dimensional subspaces, which may be of any shape, and which characterize certain subsurface features of interest.

Step 150 shows the classification step. Here one or more subspaces are selected and used to classify the points in the seismic derived layer property data sets input in step 100. The classification is achieved by determining which of the points of the classification input data sets fall within the zone of interest defined by the zone of interest definition data input in step 110 and fall within the selected subspace or subspaces. One method to determine this is as follows: Select the layer property parameter subspace or subspaces to be used for classification.

1. Define a label to typify the selected subspace or subspaces, for example a label that can take a series of values where each value defines a certain lithology and fluid type. Set a label value to typify those classification input data points that define points in layer property parameter space such that the points fall inside the selected layer property parameter subspace or subspaces. A certain label value may be reserved for points falling outside the selected subspace or subspaces. This label is further referred to as classification label. Label values may be numeric, alpha-numeric or in other form, for as long as different values can be distinguished.
2. For all grid points of the classification input layer property data input in step 100 and which fall within the zone of interest defined by the zone of interest definition data input in step 110:
    2.1. Extract the layer property parameter values at the grid point from the classification input layer property data;
    2.2. Determine if the set of layer property parameter values define a point in layer property parameter space that falls inside the selected layer property parameter subspace or subspaces;
    2.3. If the point falls inside, assign the appropriate classification label and label value to the associated grid point. If the point falls outside, optionally assign the classification label and label value appropriate for points falling outside, or leave any classification labels and/or label values unchanged.

In this way a new classification label data set on a x,y,t or x,y,z grid is created where the classification label and the assigned value classify at which grid points the associated seismic derived layer property parameter values are such that they fall inside the selected subspace or subspaces.

The above procedure is straightforward and provides a new, highly automated method for subsurface interpretation. In fact, as will be illustrated, the simple case where only one subspace is used in the classification step already results in a very powerful interpretation procedure. If required, the logic of the procedure may be made more sophisticated. For example, if multiple input subspaces are used, these may intersect spatially and thus define one or more new subspaces that may be of special interest. In that case different classification labels or label values can be assigned to points falling inside such subspaces defined by spatial intersection. Also, the process may be run several times for a different subspace or subspaces, where for each run a new classification label set is defined or previous classification labels are selectively updated.

A key aspect of the process to this point is that the classification based interpretation results are driven by an analysis step which may use the same data as the input data for classification but, importantly, may also use other sources of data such as other layer property data sets, well logs, attribute horizons and distribution functions. This provides a uniquely powerful way to tie in such data into the subsurface interpretation process.

In the above procedure the use of labels and label values is proposed as a general way to explicitly keep track of the classification results. Other alternatives are available. For example only labels may be used, where the presence or absence of one or more labels is used for tracking the classification results. Another alternative implementation is where in the above procedure the layer property parameter values of points with layer property parameter values falling outside the selected subspace or subspaces are given some null value. In this case the classification results are not available explicitly, but are implicit, specified by whether or not the parameter values of grid points in the classification input data have a null value.

Irrespective of implementation details, the output of the classification process is such that either explicitly or implicitly the classification result is available for subsequent steps in the procedure.

In step 160 the classification results are inspected. This step is optional. Typically inspection will be done visually, where various section, map or 3-D views may be used, as are commonly applied for geoscience data analysis and interpretation. Within these viewing modes, the classification results can be viewed in many different ways. For example, if classification labels are used, they can be shown, where colors are assigned to represent different classification labels and/or label values. Alternatively, only the values of any of classification input data sets is shown for those points where the classification labels have certain values or combination of values. This display can also be used in case the classification results are implicit, by showing only data points with non-null values.

Figure 7:
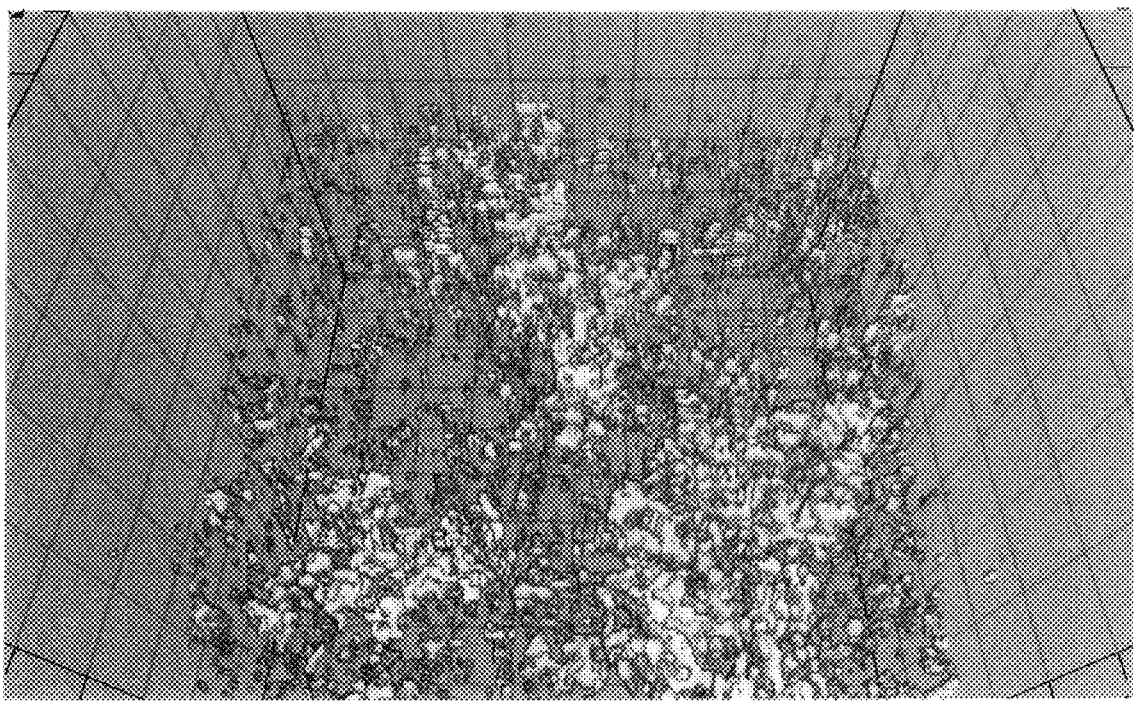
FIG. 7 shows an example of classification results. The results are obtained by the application of the subspace defined by the polygon in FIG. 6 in the classification of the subsurface from acoustic and shear impedance 3D volumes, lines of which are illustrated in FIGS. 3&4. The 3D view shows all points in space which fall inside the subspace enclosed by the polygon, and thus have characteristics corresponding to those of hydrocarbon bearing sands.

In practical application the simple case where only one subspace is used in the classification step already results in a powerful interpretation procedure. This is illustrated in FIG. 7 that shows a 3D view of a part of the subsurface encompassing an oil field. In FIG. 7 the points falling-inside the polygon of FIG. 6 are rendered, color coded with one of the input seismic derived layer properties. These points, according to the analysis and subspace definition undertaken in step 140 correspond to hydrocarbon bearing sands. These have been fully automatically detected in the previous classification step.

In the next step, step 161, the interpreter using the procedure may decide on basis of the inspection of the classification results in step 160 to continue, to redo the classification using a different subspace or subspaces, to redo the analysis and/or revise the subspace definition in step 140, or to revise any of the input data (zone of interest definition data, analysis input data, data to subset analysis input data) impacting the process for the given classification input data.

Figure 8:
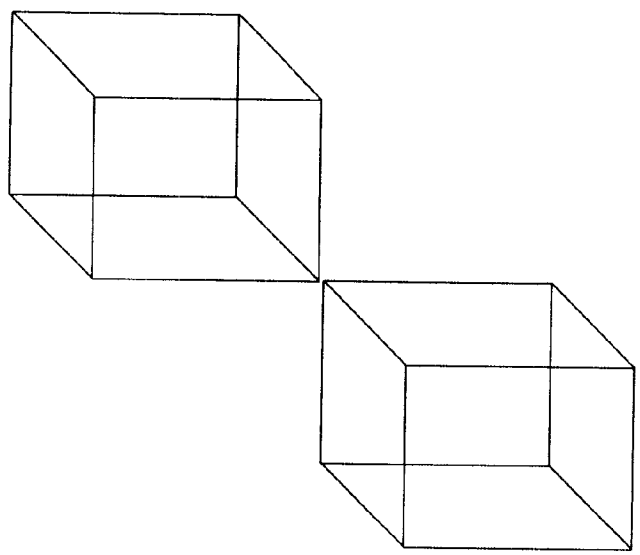
FIG. 8 illustrates different possibilities for cell connectivity. From left to right are shown cell pairs where the cells are respectively face connected, edge connected and corner connected.
Figure 8:
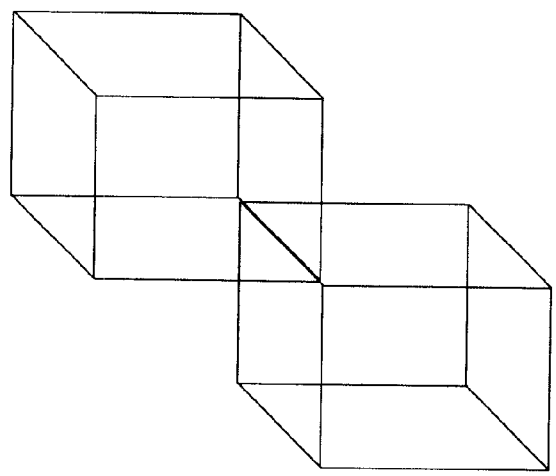
Figure 8:
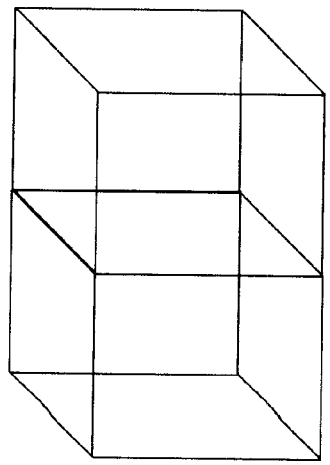

In step 170 the classification results are further analyzed with the objective to establish the spatial connectivity of the points according to their classification. Each set of spatially connected points so defines a geologic body, also referred to as a geobody. The main steps in a method to define these geobodies is as follows:

1. Identify the points to which the connectivity analysis is to be applied. In case explicit classification labels are available, such an identification can be made on basis of the classification label values, combinations of classification label values, or, if available, using values and value combinations from multiple classification labels. If the classification result is implicit, the selection will typically be limited to the points in the classification input data where the layer property parameters have non-null values.
2. The seismic derived layer property grid points may be considered to be midpoints of 3-dimensional cells. Cells that are neighboring a particular cell can then be face connected, corner connected or edge connected, as illustrated in FIG. 8. For the connectivity analysis a connectivity parameter is set which specifies how the cells around the grid points are connected, i.e. face connected, corner connected or edge connected. Cells may be cubic, brick shaped or may be hexahedrons.
3. Define a label at each grid point of the data identified in step 1 to hold information on connectivity, further referred to as connectivity label, and assign a default null value to the label at all these grid points. Label values may be numeric, alpha-numeric or in other form, for as long as different values can be distinguished.
4. Scan all points identified in step 1 to which connectivity analysis is to be applied for points with a null value for the connectivity label. Every time a such a point is found, it serves as the seed point for the application of a so called region growing algorithm to determine all points spatially connected to the seed point according to the connectivity parameter set in step 2. Spatial region growing algorithms are commonly available. Each set of connected points is assigned a unique connectivity label value to so define separate geobodies.

Many alternative implementations are possible for connectivity analysis. The essence of the method is that a new label data set on a x,y,t or x,y,z grid is created such that all points with the same non-null connectivity label define a separate geobody.

An interactive alternative to the above process is one where the connectivity analysis is combined with the visualization of step 180 below. In this procedure the points identified under step 1 above are visualized. The next step for the user is then to select any of these points as a seed point, after which all points connected to this seed point are determined and then visually highlighted in a way which visually distinguishes these points. If the user accepts the result, the connected points are assigned a unique connectivity label value and this set of points then defines a geobody. These points can then be removed in the visualization by making them transparent or they can be otherwise visualized to indicate they have passed through connectivity analysis. The user can then select a new remaining point as a seed point for a next pass of connectivity analysis, and so forth until the user decides all worthwhile geobodies have been captured.

After connectivity analysis, the next step, step 180, is inspection of the results similar to the inspection in step 160. This step is optional. Like in step 160, visualization is the key component in the inspection. In the visualization of the connectivity analysis results, the geobodies are visualized, for example by color coding points according to the value of the connectivity label. The user also has control over which geobodies are shown, for example allowing the user to not show geobodies smaller than a certain number of points and/or by highlighting geobodies dependent on whether or not they are intersected by wells. The wells used for intersection analysis may be selected by the user.

In the next step, step 181, based on the results of the analysis in step 180, the user may continue, make revisions in earlier steps or modify input data (zone of interest definition data, analysis input data, analysis subset definition data) impacting the process for the given set of classification input data.

Figure 9:
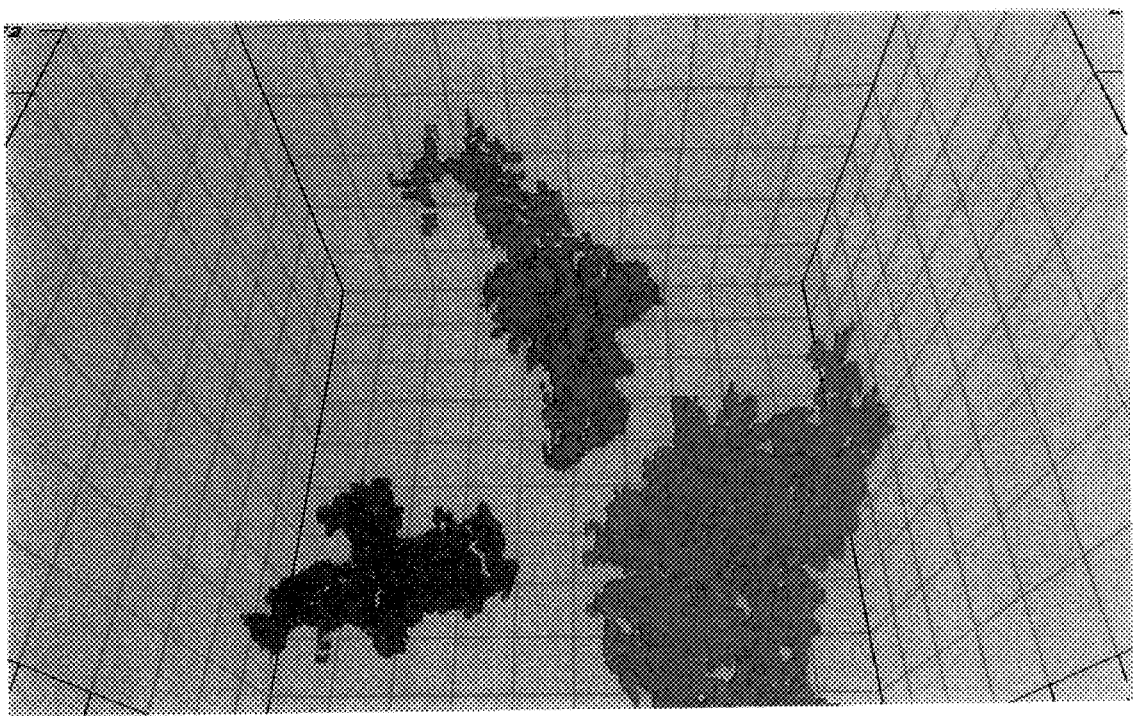
FIG. 9 shows the result of the connectivity analysis procedure applied to the classification results shown in FIG. 7. The three largest geobodies are shown. The results of the connectivity analysis show that hydrocarbons are located in multiple, spatially separate reservoir units.
Figure 11:
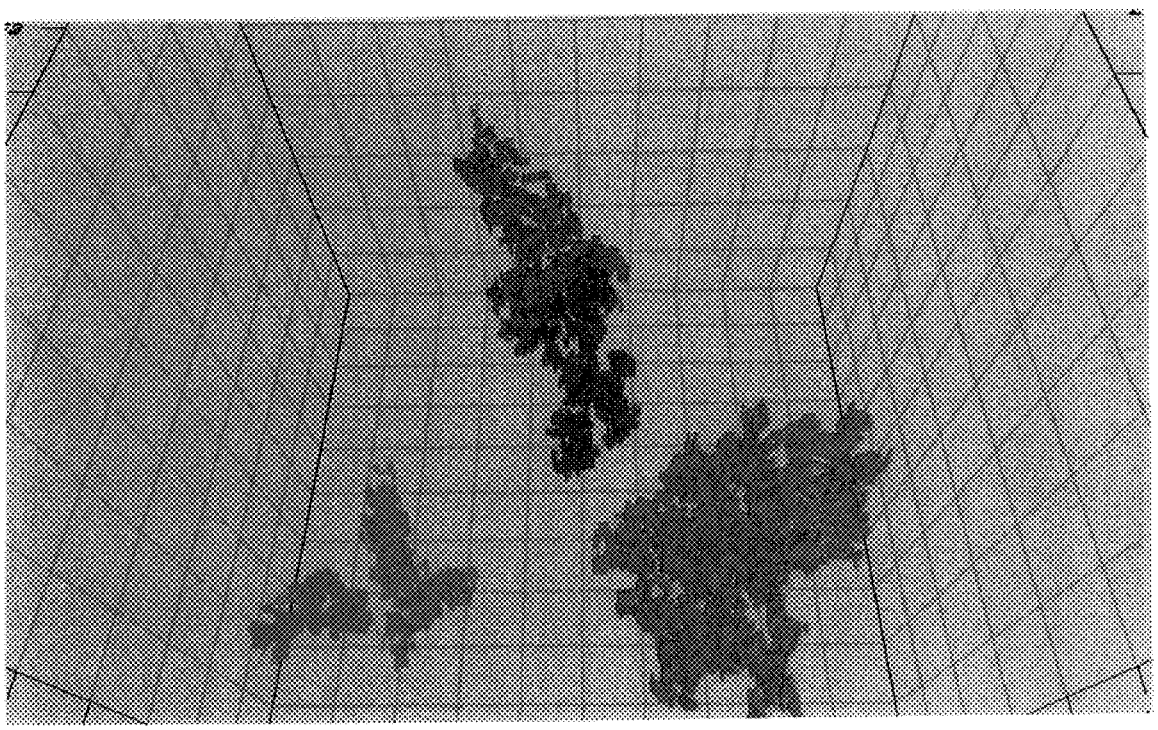
FIG. 11 shows the result of bringing in a third dimension to the example of FIGS. 6, 7 & 9 in the subspace definition, classification and connectivity analysis. In this case the additional dimension consists of a measure of geologic continuity. The third dimension is used to restrict the subspace defined in FIG. 6 to hold points with hydrocarbon bearing sands and with good continuity.

Examples are shown in FIGS. 9 and 11. In FIG. 9 the 3 largest geobodies are shown generated by connectivity analysis of the results shown in FIG. 7. These geobodies are interpreted to be hydrocarbon charged sands. FIG. 11 shows the results of a more detailed analysis on the same data used to generate FIG. 9. Here the subspace definition has been expanded from 2 to 3 dimensions by including a layer continuity attribute. In this case low values of this attribute correspond to good continuity, whereas high values indicate poor continuity. In hydrocarbon reservoir exploitation the interest is in reservoir geobodies characterized by good continuity to maximize production. Accordingly, a threshold has been set on continuity such that the subspace characterizes points with good continuity. When this 3-D subspace is now used the classification is now into 'reservoir sands with good continuity'. The connectivity analysis is also repeated, resulting in the geobodies shown in FIG. 11. When compared to FIG. 9 it is clear that some of the original reservoir sand bodies have been subdivided according to the continuity. This example is an illustration of how more dimensions can be brought into the classification step, and how the user can guide the process. The example also illustrates how with just simple subspace definitions very powerful results are obtained. Also it is important to note that with today's computational resources the classification and connectivity analysis steps 150 and 180 can be completed very quickly on large 3-D data sets of seismic derived layer properties, allowing the process as a whole to be implemented as an interactive workflow.

Figure 12:
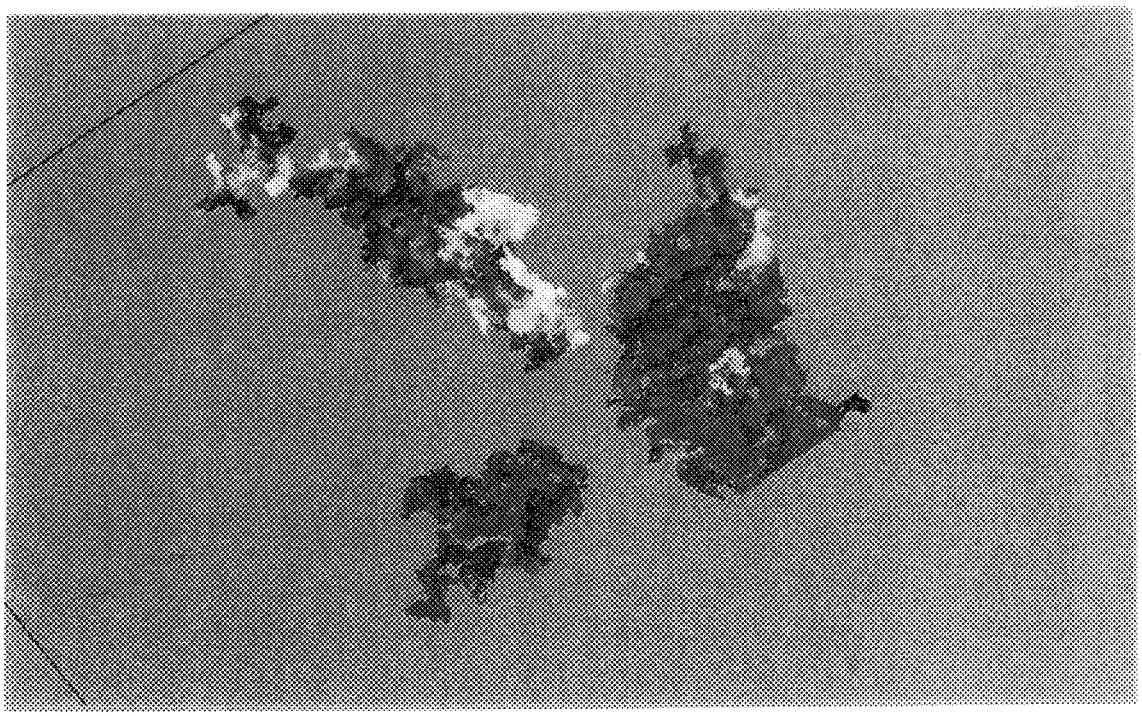
FIG. 12 shows a map view of the depth in time to the top of the geobodies shown in FIG. 9. The color coding indicates depth in time, with the lighter colors corresponding to the shallower parts of the top of the geobodies.

In step 190 the final output is generated. Dependent on subsequent applications, this may consist of various data sets: seismic derived layer property data sets if these have been modified by implicit classification (step 200); classification label data set or sets (step 210) and the connectivity label data set (step 220). In defining the output data, the user may select geobodies, for example by setting thresholds on their size. Additional highly useful output which may be generated (step 230) are horizons which for example define the top, base and thickness of the geobodies. Such horizons can be automatically generated from the connectivity label data set. Dependent on subsequent applications the horizon data can be stored separately for each geobody, or can be stored for sets of geobodies. An example of such an extracted horizon file is shown in FIG. 12 that shows the top of the geobodies of FIG. 9.

The above describes one possible embodiment of the new process. As already discussed, in an implementation several steps of the subject process may be merged into one or more steps which may be interactive or in which, for example, a decision point like step 161 is not implemented. In such embodiments the distinction into different steps becomes less apparent or is hidden. Such interactive implementations are considered examples of embodiments of the present invention.

The above process may be repeated several times One example is where certain seismic derived layer property data sets are used in a first pass to generate classification and connectivity results. In a second pass with a different set of input seismic derived layer property data sets the classification or connectivity results of pass 1 may be used in defining the zone of interest. Another example is where in several runs the subspace size used in classification is changed to generate sets of geobodies corresponding to conservative, expected and optimistic scenarios.

The method is not limited to application in hydrocarbon exploration, development and production. The method may be applied to seismic data acquired for other subsurface analysis applications, for example for shallow gas detection, subsurface stability analysis, basin analysis, coal and other mineral resource exploration and mining, and water resource development. The method is equally suited for the analysis of echo-acoustic data acquired for medical and material investigations.

The present invention is not limited to the above described embodiment and described variations; the requested rights are determined by the following claims, within the scope of which many modifications can be envisaged. It is intended to cover by the appended claims all such modifications involved within the scope of the claims.

What is claimed is:

1. A method for classification of a subsurface, comprising the steps of:
   a) inputting at least two seismic derived layer property data sets, each data set being of a certain data type, for classification of the subsurface;
   b) inputting data defining one or more zones of interest in the classification input data sets;
   c) inputting analysis data sets with data types corresponding to that of the classification input data sets, the analysis data sets being calibrated to the classification input data and the analysis data sets defining a data type space;
   d) inputting data defining a subset of interest in the analysis data sets;
   e) defining in the subset of interest within the data type space one or more data type subspaces that individually or in combination characterize one or more subsurface features;
   f) selecting at least one data type subspace to be used for classification;
   g) determining which data points of the classification input data in the zone of interest fall within said selected data type subspace or data type subspaces; and
   h) typifying these data points of the classification input data to so classify these data points of the classification input data.

2. The method according to claim 1, further including the step of visually inspecting the results of said classification.

3. The method according to claim 1, wherein after step h) performing at least one of the steps of:
   revising the subspace selection in step f);
   redefining said one or more subspaces in step e); or
   revising any of: the zone of interest in the classification input data in step b); the analysis data in step c); the subset of interest in the analysis data in step d); the definition of the subspace or subspaces in step e); and
   repeating at least steps f) to h).

4. The method according to claim 1, wherein the classification input data are defined on gridpoints of a grid and the method further including the step of assigning to each grid point of said typified part of the classification input data a connectivity label and value as a measure to define geobodies comprised of sets of spatially connected points within the classification input data.

5. The method according to claim 4, further including the steps of:
   identifying the grid points of said typified part of the classification input data to which connectivity analysis is to be applied;
   setting a connectivity parameter specifying how grid points of the classification input data are spatially connected;
   defining a connectivity label to hold information on connectivity;

assigning a connectivity label value that is indicative of unconnected grid point for all grid points in the classification input data within the zone of interest;

applying a region growing algorithm to determine all sets of grid points in the typified part of the classification input data connected in the sense of the connectivity parameter set previously; and assigning a unique connectivity label value to each set of said connected grid points to identify each such set as a separate geobody.

6. The method according to claim 5, including the step of the visualization of the separate geobodies or selected subsets of geobodies.

7. The method according to claim 5, wherein the geobodies are selected on the basis of their size and/or whether or not they are intersected by one or more wells.

8. The method according to claim 5, further including the steps of:

setting a connectivity parameter specifying how the grid points of the classification input data are spatially connected;

defining a connectivity label to hold information on connectivity;

assigning a connectivity label value that is indicative of unconnected grid point for all grid points in the classification input data within the zone of interest;

visually highlighting of the grid points of the typified part of the classification input data;

user-selecting any of the visually highlighted grid points;

applying a region growing algorithm to determine all grid points connected to the user-selected grid point in the sense of the connectivity parameter set previously; and visually highlighting these connected grid points to distinguish these points from all other points.

9. The method according to claim 8, including after highlighting of the connected grid points the steps of:

requesting the user for acceptance of these visually highlighted connected grid points of classification input data; and if the user accepts, then assigning a unique connectivity label value to said connected grid points to identify these points as forming a separate geobody.

10. The method according to claim 9, comprising:

changing the highlighting of the accepted connected grid points so that the set of points is visually distinct from the remaining typified and non-typified grid points or making the accepted connected grid points visually transparent;

selecting one of the remaining visually highlighted typified grid points;

applying a region growing algorithm to determine all grid points connected to the user-selected remaining grid point in the sense of the connectivity parameter set previously;

visually highlighting these connected grid points to distinguish these points from all other points;

requesting the user for acceptance of these visually highlighted connected grid points of classification input data; and if the user accepts, then assigning a unique connectivity label to said connected grid points, to identify these points as forming another separate geobody.

11. The method according to claim 9, wherein the steps of claim 9 are repeated until all geobodies of interest are captured.

12. The method according to claim 1, comprising the separate output of any of the seismic derived layer property data sets if these have been modified by implicit classification, classification label data set(s), connectivity label data set(s), the selected geobody or geobodies and/or the horizons describing the geobodies.

13. The method according to claim 1, wherein the classification input data is seismic derived layer property data.

14. The method according to claim 1, wherein the analysis data is seismic derived layer property data which may be the same wholly or in part as the classification input data or may be different.

15. The method according to claim 1, wherein the analysis data are well log data.

16. The method according to claim 1, wherein the analysis data are attribute horizons.

17. The method according to claim 1, wherein the analysis data comprises distribution functions.

18. The method according to claim 1, wherein said subspaces are defined through polygons, polyhedrons, thresholds, a combination of polygons and thresholds or a combination of polyhedrons and thresholds.

19. The method according to claim 1, wherein a smooth line or surface definition is used to define said subspaces.

20. The method according to claim 1, wherein the subspaces are defined in whole or in part with the help of crossplots generated from the analysis data.

21. A computer program for implementing the method according to claim 1 on a computer.

22. A computer program product directly loadable into the internal memory of a digital computer, comprising software code portions for performing the method steps of claim 1 when said product is run on a computer.

23. A computer readable medium on which is recorded a computer program, wherein the program makes the computer execute the method steps of claim 1.

24. The method according to claim 1, wherein step g) comprises extracting the values of the data points of the classification data sets and determining which values fall within the selected data type subspace of data type subspaces.

25. The method according to claim 24, wherein step h) comprises assigning a classification label and label value to the data points inside the selected subspace or subspaces.

26. The method according to claim 24, comprising assigning a classification label and value to the data points outside the selected subspace or subspaces.

27. The method according to claim 25, comprising assigning a classification label and value to the data points outside the selected subspace or subspaces.

28. The method according to claim 1, comprising the step of inputting in step e) analysis data of one or more further data types.

29. The method according to claim 1, comprising assigning a label or a label and label value to said typified points of the classification input data.

30. The method according to claim 29, wherein in case of multiple subspaces different labels or label values are assigned to the classification input data falling within the space defined by spatially intersecting subspaces.

31. The method according to claim 1, wherein step h) comprises the step of replacing the values of the classification input data points falling outside said selected data type subspace or subspaces by one or more prespecified values.

* * * * *

UNITED STATES PATENT AND TRADEMARK OFFICE
CERTIFICATE OF CORRECTION

PATENT NO. : 6,618,678 B1
DATED : September 9, 2003
INVENTOR(S) : Paul Van Riel

It is certified that error appears in the above-identified patent and that said Letters Patent is hereby corrected as shown below:

Title page,
Item [56], References Cited, U.S. PATENT DOCUMENTS, "6,125,877" should read -- 6,128,577 --.

Column 4,
Line 13, delete "dr".
Line 63, "comer" should read -- corner --.

Column 7,
Line 26, "modem" should read -- modern --.

Column 9,
Line 34, after "falling" delete "-".

Column 13,
Line 18, "5" should read -- 4 --.

Signed and Sealed this

Sixth Day of April, 2004

JON W. DUDAS
*Acting Director of the United States Patent and Trademark Office*